Patented Feb. 17, 1942

2,273,786

UNITED STATES PATENT OFFICE 2,273,786

PREPARATION OF ACIDS AND ACETALS FROM ESTERS AND ALDEHYDES

Donald J. Loder, Wilmington, Del., assignor to E. I. du Pont de Nemours & Company, Wilmington, Del., a corporation of Delaware No Drawing. Application December 12, 1939, Serial No. 308,823

15 Claims. (Cl. 260—338)

This invention relates to a process for the conversion of organic acid esters to acids and more particularly to the preparation of acids and formals by the reaction of esters with formaldehyde.

An object of the present invention is to provide a process for the conversion of an organic acid ester to its corresponding acid by reacting the organic acid ester with an aldehyde in the presence of water and obtaining an acetal, in addition to the corresponding acid. Other objects are to provide a process for the preparation of acetic acid from an ester of acetic acid by reacting the ester with formaldehyde in the presence of water; to provide a process for the preparation of formic acid from a polyhydric alcohol formate by reacting the polyhydric alcohol formate with aqueous formaldehyde and to provide catalysts and conditions under which the reactions may be carried out. Other objects and advantages of the invention will hereinafter appear.

The above and other objects of the invention, which will become more apparent as the details of the process are more fully explained, are realized by reacting a saturated organic acid ester with an aldehyde and water, preferably at the boiling point of the mixture. As a result of the reaction, an acetal is formed between the aldehyde and the ester, the alkyl groups of the ester combining with the aldehyde to produce the acetal, the ester residue combining with water to form the acid. The reaction may be carried to substantial completion if the acetal formed is more volatile than any of the other reactants or products present during the reaction and is removed from the zone of reaction by distillation as rapidly as it is formed. The same advantageous result can be obtained if the acetal forms a minimum boiling azeotrope with one of the constituents present or with an added azeotrope-forming agent, the azeotrope being removed as formed.

Esters of acetic acid can be converted to acetic acid and a formal in accord with the process illustrated by the following equation:

2CH₃COOR+CH₂O+HOH→
2CH₃COOH+CH₂(OR)₂

Thus, when two moles of methyl acetate, one mole of formaldehyde and one mole of water are reacted, under conditions hereinafter more fully particularized, there is produced two moles of acetic acid per mole of formal. In a like manner, formic acid, and the cyclic formal, glycol methylene ether, may be obtained from glycol diformate and formaldehyde in accord with the following equation:

HCOOCH₂CH₂OOCH+CH₂O+HOH→
2HCOOH+

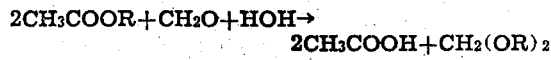

Not only can the organic acid esters specifically described above be reacted with formaldehyde in accord with the invention but also other esters may be reacted such, for example, as the alkyl esters of the aliphatic monocarboxylic acids, for example, the methyl, ethyl, normal and isopropyl, normal and isobutyl, and higher branched and straight chain alkyl esters of formic, acetic, propionic, butyric, valeric and the higher aliphatic monocarboxylic acids; similar alkyl esters of the aromatic acids such as, for example, benzoic, and toluic acids; similar alkyl esters of the substituted aliphatic organic acids such as hydroxy acetic, hydroxy propionic, alkoxy acetic and alkoxy propionic acids, etc., and especially methoxy, ethoxy, and propoxy acetic acids; similar alkyl esters of the dibasic aromatic organic acids such as phthalic acid; the polyhydric alcohol esters in which one or more of the OH groups have been replaced by aliphatic or aromatic mono- or dibasic acids such as glycol mono- and diformate and mono- and diacetate, propylene glycol mono- and diformate and mono- and diacetate and the higher polyhydric alcohol mono- and polyformates, polyacetates and polyacylates of the higher acids; and, in fact, any ester of an organic acid may be used which forms a stable acid when the alkoxy group of the ester has been replaced by a hydroxyl group.

The aldehydes which may be used in the reaction include, for example, in addition to formaldehyde already described, acetaldehyde, propionaldehyde, butyraldehyde and the higher branched and straight chain aldehydes. Formaldehyde may be used in its aqueous solution (formalin is satisfactory), or in the form of trioxymethylene it may be added to an aqueous solution of the ester to be converted.

It has been found that the reaction is preferably conducted in the presence of a suitable acidic-type catalyst such, for example, as sulfuric acid, phosphoric acid, hydrochloric acid, boron trifluoride and like comparatively strong acidic-type catalysts. While it is recommended that a catalyst of this nature be employed, the reaction will proceed in its absence but at a slower rate under temperature conditions described below. It is advisable to use but small amounts of catalyst, say, from 0.1% to 10% of the ester reacted.

The reaction is preferably conducted at the reflux temperature of the mixture under normal pressures, although the reaction will go at temperatures above or below such temperatures. The reaction, also, may be carried out at pressures in excess of 1 atmosphere up to, for example, 100 atmospheres, or higher, or at pressures below atmospheric down to from 300 to 200 mm., if desired. The temperature of the reaction is not particularly critical, although temperatures between 30° and 150° C. are recommended.

The ratio of ester to aldehyde and water is preferably maintained with a molal excess of the ester and water. For the reaction of polyhydric alcohol polyacylates, as well as the dibasic acid diesters, only one mole of ester per mole of aldehyde is required, while two moles are required for reaction with the monohydric alcohol monobasic acid esters.

Examples will now be given to illustrate preferred embodiments of the invention, but it will be understood that the details thereof will not restrict the scope of the invention. Parts are by weight unless otherwise noted.

*Example I.*—A reaction mixture consisting of 666 parts of methyl acetate, 160 parts of water, 90 parts of paraformaldehyde and 15 parts of concentrated sulfuric acid is charged into a still having an efficient fractionating column and a total reflux type head. The reaction mixture is heated to boiling at atmospheric pressure. With the fractionating column operating under total reflux, the temperature in the still head soon falls to 41 to 42° C. which is the boiling point of methylal. When this condition obtains, the distillate is withdrawn from the system at such a rate that the temperature remains below 43° C. In this way there is obtained 178 parts of a distillate which is essentially methylal containing traces of methyl acetate. The material remaining in the still is now fractionally distilled. First there is obtained an intermediate fraction boiling between the temperatures 43° and 100° C., but mainly at 55 to 56°, consisting, mainly, of unreacted methyl acetate. Next there is obtained a fraction boiling between the temperature 100° and 114° C. This material is an aqueous solution of acetic acid containing 301 parts of acetic acid. The residue remaining in the still consists of sulfuric acid with a small amount of acetic acid.

*Example II.*—A reaction mixture consisting of 130 parts of glycol diformate, 33 parts of paraformaldehyde, 54 parts of water and 5 parts of concentrated sulfuric acid is charged into a still having an efficient fractionating column. The reaction mixture is boiled under reflux at atmospheric pressure and an azeotrope of glycol methylene ether drawn off under high reflux ratio throughout the reaction. 60.4 parts of distillate is thus collected boiling between 67 and 90° C. at 760 mm. pressure. This material is largely a water azeotrope of glycol methylene ether. 107 parts of a second fraction boiling between the temperatures 96° and 107° is obtained, which is largely formic acid. The still residue is mostly unreacted glycol diformate.

From a consideration of the above specification, it will be appreciated that many changes may be made in the details therein given without departing from the scope of the invention or sacrificing any of the advantages that may be derived therefrom.

I claim:
1. A process which comprises reacting an organic ester of an organic acid, which forms a stable acid when the alkoxy group of the ester has been replaced by a hydroxyl group, with an aldehyde and water, and thereby obtaining the corresponding acid and acetal.

2. The process of claim 1 conducted under reflux at normal pressures.

3. The process of claim 1 conducted in the presence of an acidic catalyst.

4. A process which comprises reacting an organic ester of a saturated organic acid, which forms a stable acid when the alkoxy group of the ester has been replaced by a hydroxyl group, with an aldehyde and water and continuously, through the reaction, withdrawing the acetal formed.

5. A process which comprises reacting an organic ester of a saturated aliphatic organic acid with formaldehyde and water and continuously, throughout the reaction, withdrawing the formal by distillation as formed.

6. A process for the conversion of an organic acid ester, which forms a stable acid when the alkoxy group of the ester has been replaced by a hydroxyl group, to the corresponding organic acid and simultaneously producing an acetal which comprises reacting an organic acid ester, the corresponding acid of which is stable in the presence of an aldehyde and water, with that aldehyde and water, and withdrawing, throughout the reaction, the acetal substantially as formed.

7. The process of claim 6 in which the aldehyde is formaldehyde.

8. The process of claim 6 in which the acid ester is an aliphatic organic ester and the aldehyde is formaldehyde.

9. The process of claim 6 in which the acid ester is an aromatic organic ester and the aldehyde is formaldehyde.

10. The process of claim 6 in which the acid ester is a polyhydric alcohol organic acid ester.

11. A process of preparing acetic acid and methylal which comprises reacting methyl acetate with formaldehyde and water in the presence of an acidic catalyst.

12. A process of preparing formic acid and glycol methylene ether which comprises reacting ethylene glycol diformate with formaldehyde and water in the presence of an acidic catalyst.

13. A process for the preparation of acetic acid and methylal which comprises reacting, under reflux temperatures, a mixture containing approximately 666 parts of methyl acetate, 90 parts of paraformaldehyde, 160 parts of water and 15 parts of concentrated sulfuric acid, withdrawing by distillation the methylal as formed and subsequently recovering from the reaction mixture the acetic acid.

14. A process for the preparation of formic acid and glycol methylene ether which comprises reacting, under reflux temperature, a mixture containing 130 parts of glycol diformate, 33 parts of paraformaldehyde, 54 parts of water and 5 parts of concentrated sulfuric acid, withdrawing by distillation the glycol methylene ether-water azeotrope as formed and recovering from the reaction products formic acid and glycol methylene ether.

15. A process which comprises reacting a glycolmonoformate with formaldehyde and water in the presence of an acidic catalyst.

DONALD J. LODER.